United States Patent Office 3,522,197
Patented July 28, 1970

3,522,197
GLUTEN HYDROLYSATE DERIVATIVES AND COMPOSITIONS COMPRISING THE SAME
Catherine Aranyi, Chicago, Kurt Gutfreund, Park Forest, Ervin J. Hawrylewicz, Olympia Fields, and Joseph S. Wall, Peoria, Ill.; said Wall assignor to the United States of America as represented by the Secretary of Agriculture
No Drawing. Filed Nov. 2, 1967, Ser. No. 680,030
Int. Cl. C08f 45/00
U.S. Cl. 260—8     2 Claims

ABSTRACT OF THE DISCLOSURE

Epoxy and imino derivatives of the large peptide fraction of partially hydrolyzed gluten have utility as internal plasticizers for polyanhydride, epoxy, and other resins and for the preparation of a variety of specialty films and adhesives.

---

This invention relates broadly to ethylene oxide derivatives and to ethylene imine derivatives of partially hydrolyzed cereal grain gluten and to self-seal adhesives thereof as well as to therewith plasticized films that are eminently suited as rapidly dissolvable envelopes containing a unit amount of washing machine detergent.

The primary purpose of our invention is the discovery of a variety of highly useful derivatives and acrylic type copolymers of gluten whereby the industrial utilization of wheat flour may be considerably enhanced.

A more specific object of our invention is the discovery of novel internal plasticizers for polyanhydride and epoxy resins and for the flexibilization of amylose, gluten, PVA, and similarly brittle water soluble films, and of a self-seal adhesive composition that exhibits a somewhat greater resistance to peel at 10° C. from a smooth steel substrate than does the widely known self-stick transparent tape.

The partially hydrolyzed gluten polypeptide starting material is obtained by dispersing either commercially obtained vital gluten (containing about 20% residual starch) or laboratory process starch-free gluten obtained from wheat starch by the method of Jones et al., Arch. Biochem. and Biophys. 84:363 (1959), in 49 times its weight of an acid mixture that consists of 0.1 N hydrochloric acid and 4 N acetic acid and exposing the therein dispersed 2 percent content of protein to 24 hours of partial hydrolysis at 60° C. In the case of commercial gluten, the hydrolysate preferably is freed of its non-reacted starch and lipid by high speed centrifugations before the gel filtration step on a column of Sephadex G25 is applied to the hydrolysate to remove the inorganic (ammonium salt) byproducts of the hydrolysis as well as the small peptides. Elution with 4 N acetic acid, during which the aliquots of the eluant are monitored spectrophotometrically by UV absorbancy at 280 m$\mu$ for the proteinaceous components and by nesslerization at 490 m$\mu$ for the first appearance of ammonia provides the desired principal first fraction containing essentially only the large polypeptides, in which purified fraction the number of free amino groups from the cleavage of peptide bonds as determined by the ninhydrin reaction corresponds to 1.4 $\mu$M leucine equivalents per milligram total nitrogen. Gel filtration values on Sephadex show the average molecular weight of the polypeptide mixture to be between 10,000 and 20,000.

The purified gluten hydrolysate dried by lyophilization is acetic acid soluble. The product can be converted into the water soluble form by preparing its 5-percent dispersion in water and by slowly adding sufficient NaOH to bring the pH from an original value of about 3 to 8.0.

EXAMPLE 1

A stainless steel pressure bomb was charged with 1 part by weight of the previously described acetic soluble gluten hydrolysate and 5 parts by weight of ethylene oxide and then maintained at 85° C. for 48 hours. The obtained epoxidized gluten hydrolysate product, which we will for brevity call ETOG, was homogenous viscous liquid that, unlike the protein, was soluble in water and in organic solvents including acetone, benzene, methanol, ethanol, and methylene chloride. Amino acid analysis of the ETOG showed that the expoxidation had resulted in the loss of aspartic and glutamic acids as well as of serine, threonine, and tyrosine. ETOG had a sedimentation coefficient of 0.92 Svedberg unit.

EXAMPLE 2

Example 1 was repeated excepting that ethylene imine was substituted for the ethylene oxide. The iminated reaction product, designated EIG, was readily isolated from the homopolymerized ethylene imine byproduct by precipitation with acetone. The purified EIG was found to be insoluble in nonpolar solvents, partly soluble in water, and soluble in formamide.

EXAMPLE 3

A commercially obtained polyanhydride resin available from General Aniline and Film Corp., New York, N.Y., under the proprietary name of "Gantrez An–139," a poly(methyl vinyl ether/maleic anhydride) copolymer resin of medium viscosity, dissolved in water to provide a 10-percent solution, was heated for 2 hours at 70° C. in the presence of a small amount of concentrated $H_2SO_4$ to hydrolyze the resin. Films prepared from the hydrolyzed polyanhydride resin, as expected, were found to be extremely brittle even when exposed to a relative humidity of 40 percent.

A 10-percent total solids solution containing equal amounts of the above polyanhydride and ETOG and the previously employed amount of $H_2SO_4$ was heated for 2 hours at 70° C. Air-dried films prepared from the reaction mixture were found to be water soluble and were highly flexible without any tendency to crack.

The viscous product obtained from refluxing an anhydrous acetone solution of the polyanhydride and ETOG at 58° C. for 1 hour followed by partial removal of the solvent gave films that were very flexible but which were insoluble in water.

Polyvinyl alcohol films are known to exhibit brittleness in low humidity environments. Films cast from a 1:1 PVA–ETOG reaction mixture corresponding to the ETOG-flexibilized polyanhydride where much less brittle than films from the PVA per se.

Films cast on tinfoil from a methanol solution of purified intact gluten prepared by the method of Jones et al., supra, were extremely brittle and fractured badly when removal by amalgamation was attempted. A ⅙ part by weight incorporation of ETOG did not greatly improve the flexibility of the film whereas an equal incorporation of ETOG gave films that were highly flexible but suffered from incomplete transparency. A 3:1 gluten/ETOG formulation provided flexible, transparent films. The preparation of intact films from water soluble (NaOH neutralized) gluten hydrolysate is practically impossible because of the pronounced crack sensitivity of this material. Addition of ETOG to the neutralized hydrolysate in a 1:6 weight proportion ensured coherence and imparted the desired flexibility to films cast from aqueous solution.

EXAMPLE 4

Effective plasticizers for epoxy resins are needed in many potting, encasing, and sealing employments of epoxies, particularly where these applications involve exposure to low temperature, at which mechanical stresses arising from dimensional changes in the highly rigid resin result in failure. A 1:1 mixture of "Epon 828" (registered name of Shell Chemical Corp., New York, N.Y., for its lower molecular weight condensation polymer of epichlorohydrin and bisphenol-A) and ETOG along with 10 percent of diethylene triamine catalyst based on the weight of the epoxy constituent was cast as a 20-mil film and cured at 25° C. Whereas the epoxy per se gave a hard, relatively brittle material, the plasticized epoxy film was flexible and leather-like.

EXAMPLE 5

A 1:1 mixture of ETOG and hydroxyethyl methacrylate was reacted at 80° C. for 2 hours in the presence of 2-percent tert. butyl peroxide initiator based on the weight of the acrylic monomer. The partially polymerized viscous material was transferred from the beaker to test tubes, and the polymerization was continued in bulk for 24 hours. The resulting addition polymer was spread on cellophane, Mylar, and saran from a 10-percent solids solution in methanol, and the coated tapes along with control tapes coated with hydroxyethyl methacrylate per se were stored at 25° C. and 40 percent R.H. for 3 weeks.

Whereas the methacrylate per se even initially showed no clearly adhesive properties and dried completely within 2 days, the highly adhesive addition polymer was found at the end of the test period to have retained its marked pressure sensitive adhesive property.

Whereas the adhesive peel strength at room temperature as measured by an Instron tester for stripping "Scotch" brand cellophane tape from specially prepared stainless steel surfaces at a rate of 12 in./min. averaged 1.5 lbs./sq. in. and registered a maximum value of 2.2 lbs./sq. in., tapes coated with a tert. butyl hydroperoxide catalyzed 1:1:1 reaction product of ETOG, hydroxyethyl methacrylate, and ethyl acrylate required an average peel force of 2.8 lbs./sq. in. and a maximum of 3.2 lbs./sq. in. to remove the tapes. When plies of manilla folder that had been laminated with the above adhesive were pulled apart at an angle of 180°, tearing of the paper fibers was evident, showing that the adhesive bond was stronger than the cohesive strength of the bonded material.

For price labels where a clean release is desirable a 2:1:1 ETOG, HEMA:Bu acrylate formulation has applicability.

The replacement of ethylacrylate in the penultimate formulation of octyl acrylate facilitated the release of the adhesive from a paper substrate and also to a very small extent at 5° C. exceeded the negligible adhesion to steel at that temperature of "Scotch" brand tape.

EXAMPLE 6

Ethylene imine modified partially hydrolyzed gluten (EIG) of Example 2 was added to an aqueous solution of NaOH-neutralized partially hydrolyzed gluten (SGH) in amounts equivalent to SGH/EIG ratios of 1:1, 2:1, 4:1, and 6:1. The 10-percent total solids solutions provided transparent 3 mil films that showed increasing tensile strength with increasing weight proportion of SGH accompanied by increased stiffness and brittleness. The 6:1 SGH:EIG films dried without the development of cracks and exhibited an ultimated yield strength of 1,500 p.s.i. and an elongation at yield of 15 percent, which values are comparable with those shown by polyvinyl butyral and PVA films. Glu-sealed 6:1 SGH:EIG envelopes containing 15 grams of a conventional washing machine detergent were dropped into an automatic washer, and the detergent was released in 30 seconds. Brief exposure of the envelopes to formaldehyde vapor can be employed to delay disintegration. Similar envelopes from a 6:1 SGH:ETOG formulation released the detergent in only 15 seconds, but the persistent slight tackiness of these envelopes probably would evoke some consumer objection.

In view of the recent shift from the packaging of motor oil in metal cans to aluminum-foil-lined fiberboard, we tested the oil barrier capabilities of 1.5–2.0 mil films cast from the 6:1 SGH:EIG formulation by placing 2 drop portions of edible safflower oil and of 10W motor oil on the experimental film closely resting on a sheet of white paper, both sheets being taped to a glass plate which was then placed in a 60° oven for 64 hours. An identical comparison test was run using polyethylene as the barrier material. Inspection of the exposed plates showed that while both oils had markedly penetrated the polyethylene, none whatever had penetrated the experimental barrier.

A nonexclusive, irrevocable, royalty-free license in the invention herein described, throughout the world for all purposes of the United States Government, with the power to grant sublicenses for such purposes, is hereby granted to the Government of the United States of America.

We claim:

1. Films formed from a polymeric material selected from the group consisting of NaOH-neutralized partially hydrolyzed gluten, unhydrolyzed gluten, sulfuric acid-hydrolyzed poly(methyl vinyl ether/maleic anhydride) resin, polyvinyl alcohol, epichlorohydrin-bisphenol A condensate, said films containing as a uniformly incorporated plasticizer therefor from ⅙ part to 1 part based on the weight of the above polymeric material of purified gluten hydrolysate derivative that is formed by reacting 5 parts by weight of a 3-membered cyclic compound selected from the group consisting of ethylene oxide and ethyleneimine with 1 part by weight of the column-purified acetic acid eluate of gluten that has been partially hydrolyzed by digestion at 60° C. for 24 hours in 49 times its weight of a mixture representing 0.1 N hydrochloric acid and 4 N acetic acid to a separable polypeptide fraction having an average molecular weight of 10,000–20,000 and wherein the polypeptides contain amino groups corresponding to 1.4 $\mu$M leucine equivalents per milligram of total nitrogen.

2. An envelope that liberates its contained unit amount of laundry detergent in about 30 seconds after being placed in water, said envelope having a thickness of 3 mils and consisting of 6 parts by weight of the subsequently neutralized (pH 8.0) purified eluate of the partially hydrolyzed gluten of claim 1 and in intimate admixture therewith, 1 part by weight of the ethyleneimine-reacted purified eluate of the partially hydrolyzed gluten of claim 1.

References Cited

UNITED STATES PATENTS 3,413,229  11/1968  Bianco _____ 252—93
2,831,847  4/1958  Selle _____ 260—112

JULIUS FROME, Primary Examiner

J. H. MILLER, Assistant Examiner

U.S. Cl. X.R.

106—124, 136, 147, 153, 161; 206—84; 252—93; 260—112